S. G. CROKER.
CHARGING MEANS FOR GREASE CUPS.
APPLICATION FILED JUNE 13, 1917.
1,258,876.
Patented Mar. 12, 1918.
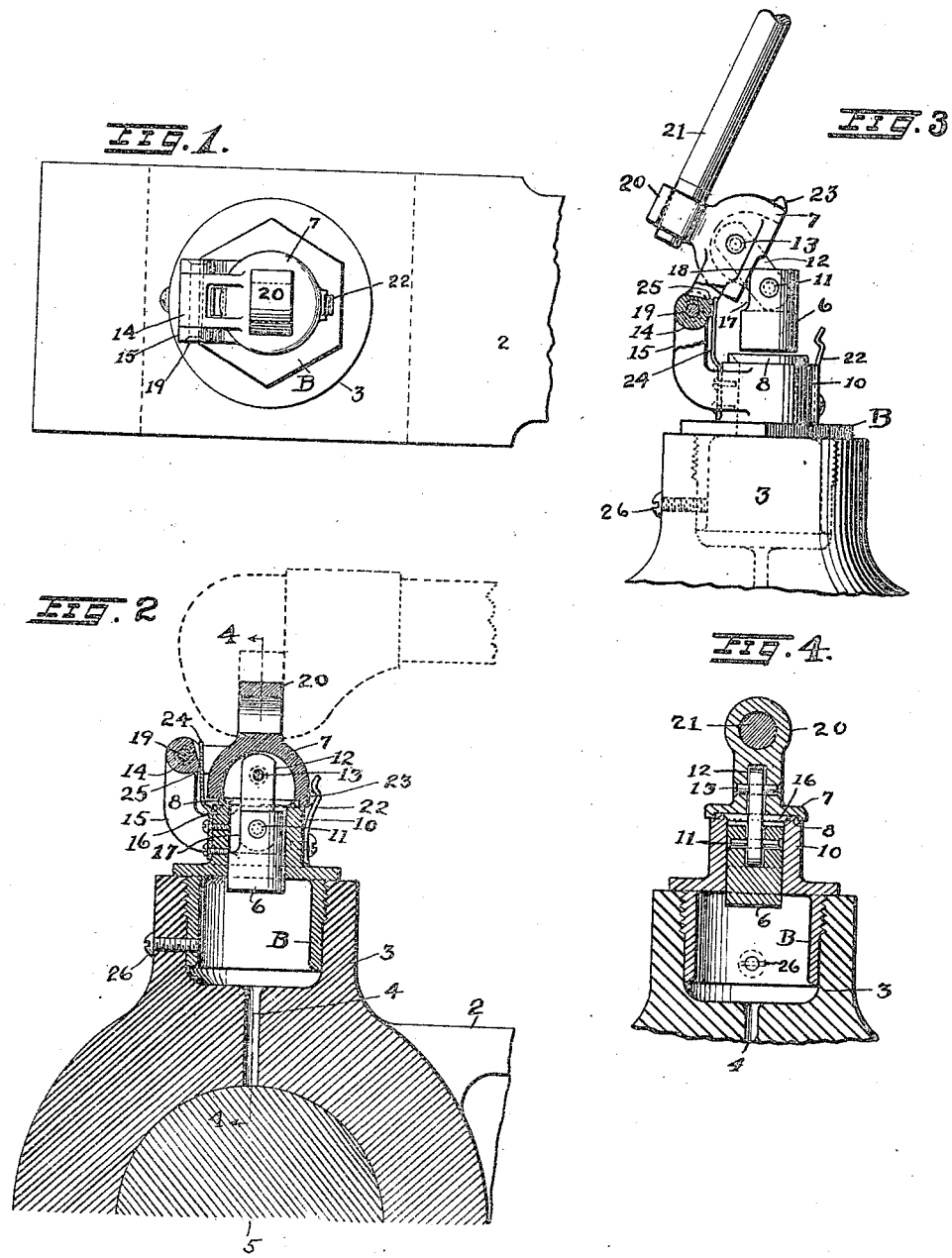
INVENTOR
S. G. CROKER.
BY
ATTORNEYS

UNITED STATES PATENT OFFICE.

STEPHEN G. CROKER, OF CLEVELAND, OHIO, ASSIGNOR OF ONE-HALF TO J. H. LYONS, OF CLEVELAND, OHIO.

CHARGING MEANS FOR GREASE-CUPS.

1,258,876.  Specification of Letters Patent.  Patented Mar. 12, 1918.

Application filed June 13, 1917. Serial No. 174,462.

*To all whom it may concern:*

Be it known that I, STEPHEN G. CROKER, a citizen of the United States, residing at Cleveland, in the county of Cuyahoga and State of Ohio, have invented certain new and useful Improvements in Charging Means for Grease-Cups, of which the following is a specification.

This invention relates to charging means for grease cups, the object being to provide a simple and practical device adapted to load or fill the grease cups or pockets on the connecting rod or other working part of a locomotive engine or other machine. This charging device is designed to be applied in covering and closing position upon the cup or pocket and is particularly constructed to afford quick and convenient access to the cup or pocket without unscrewing any member. In use, the device has the following advantage, that the charge or stick of grease is placed under compression by the simple act of closing and seating the cover, using no other tool or appliance than a rod, bar or wrench engaged with the cover, and when fully closed the parts are locked automatically.

In the accompanying drawing Figure 1 is a plan view of the charging device secured in place upon a connecting rod, and Fig. 2 is a side view in section of the same organization of parts. Fig. 3 is a side elevation of the device with the plunger in raised position opposite the charging bore of the cup. Fig. 4 is a view in section taken on line 4—4, Fig. 2.

Each connecting rod 2 of an engine is usually provided with one or more grease cups or pockets 3 having a feed duct 4 leading to a pin or shaft 5. The ordinary practice is to provide a solid screw-plug to close the cup or pocket 3, but because these cups require frequent charging the screw threads are soon destroyed by repeated removal and replacement of the plugs. Not one, but many, up to sixteen or more such cups, are used in one engine, and the work required to unscrew the plugs to examine and charge all the cups and to screw the plugs in place again, causes wear and takes considerable time. This wear is entirely eliminated and the length of time for examining and charging the cups is materially lessened by the use of my invention, which comprises a charging plunger 6 linked to a cover or cap 7 which is hinged to swing open and shut relatively to the upper end or seat 8 of a tubular extension 10 located centrally above the grease cup or pocket 3. The plunger 6 is split and has a cross pin 11 to which the link 12 is connected, and the upper end of the link projects into a flat-sided recess within the cover and is pivotally connected thereto by a pin 13, while the cover has a laterally-extending arm 14 in hinge connection with an upright arm or pair of arms 15 integral with extension 10. The bore of this extension has a flaring entrance 16 for the plunger, and the plunger has a portion of its side removed at 17, and the rim of the cover is also partially cut away at 18, to facilitate a close working union between the parts and so that the plunger may leave and enter the bore on a straight line parallel with the axis of the bore when the cover is turned on its pivot pin 19. The stick of grease which is placed in the bore is relatively hard and considerable pressure is required to force it into the grease cup under certain conditions. Therefore, cover 7 is provided with a perforated lug or projection 20 at its top adapted to receive a rod or bar 21 of any suitable length wherewith to gain the necessary leverage to press the charge through the bore into the larger chamber or pocket 3. The opposite sides of projection 20 are also flat, preferably, to permit a wrench to be applied to turn the cover in the absence of the rod or bar 21, see dotted lines Fig. 2.

In view of the fact that a device of this kind is very subject to displacement where applied to a moving element such as the connecting rod of an engine, it is essential that the cover be securely held or locked when closed and seated. For that purpose, a stiff flat spring catch 22 is fastened to the side of extension 10, and a beveled projection 23 is cast near the edge of the cover to engage the beveled locking end of the spring. This device is self-locking and unlocking in effect upon the application of sufficient force through a lever or wrench to the cover, and the locking effect may be supplemented by a flat spring 24 in bearing engagement with the flattened and eccentric portion 25 of the hinge arm of the cover. Spring 24 also serves to hold the cover and plunger in raised position, see Fig. 3.

Extension 10 is shown in the present instance as an integral part of a screw-threaded body B which is adapted to be screwed into the screw-threaded grease cup or pocket 3 in a connecting rod, and a set screw 26 is used to make the union secure and safe and a permanent fixture of the connecting rod. On the other hand, these parts may be welded in place or the extension made an integral part of the rod. As shown, the body B and the parts carried thereby are sold together and adapted to substitute the screw plugs now in use with all the added advantages as stated.

What I claim is:

1. A charging device for a grease cup, having a bore to receive a charge of grease, a cover hinged to swing upwardly opposite the entrance to said bore, a plunger linked to the bottom of said cover in entering relation to said bore, and said cover having means wherewith pressures may be imparted to the cover and plunger to seat the cover and by the same movement press the charge through the bore.

2. A charging device for a grease cup, having a charging bore, a cover hinged to close said bore, a plunger pivotally connected with said cover to press the charge through the bore upon a closing movement of the cover, and means to lock said cover in closed position and said plunger from being withdrawn from said bore.

3. A charging device for a grease cup, having a supply bore, a swinging cover to close said bore, a plunger linked to the bottom side of said cover in entering relation to said bore, and a snap lock for said cover.

4. A charging device for a grease cup, having a charging bore, a cover hinged opposite said bore, a straight plunger for said bore pivotally suspended from said cover to slide within said bore, means to secure said cover in seated position with the plunger immovably confined within the bore, and means to raise and lower said cover and plunger jointly.

5. A charging device for a grease cup, having a charging bore, a plunger to enter said bore, and a cover hinged opposite said bore having a link connection at its bottom with said plunger and a projection at its top wherewith a lever device may be engaged to raise and lower said cover and plunger jointly.

6. A charging device for a grease cup, having a charging bore, a plunger for said bore, and a cover for said bore having hinged connection with said plunger and an opening adapted to receive a lever to apply pressure to said cover.

7. A charging device for a grease cup, having a charging bore, a hinged cover for said bore having a plunger linked to its bottom in entering relation to said bore and provided with a perforated projection at its top for a pressure-applying instrument.

8. A charging device for a grease cup, comprising a screw-threaded body having a tubular extension, a cover hinged to said extension opposite said extension, a plunger in linked connection with the bottom of said cover and removably socketed within said extension, and means to apply pressure to said cover and plunger jointly in charging operations.

9. A charging device for a grease cup, comprising a screw-threaded body having a central charging bore, a cover hinged opposite said bore, a plunger in link connection with the bottom of said cover and adapted to enter said bore, a snap lock for said cover, and said cover being provided with means to detachably affix a pressure-applying instrument thereto.

Signed at Cleveland, in the county of Cuyahoga, and State of Ohio, this 2nd day of June, 1917.

STEPHEN G. CROKER.

Copies of this patent may be obtained for five cents each, by addressing the "Commissioner of Patents, Washington, D. C."